United States Patent
Shimura et al.

(10) Patent No.: US 12,522,671 B2
(45) Date of Patent: *Jan. 13, 2026

(54) PARAMYLON-BASED RESIN, MOLDING MATERIAL, MOLDED BODY, AND METHOD FOR PRODUCING PARAMYLON-BASED RESIN

(71) Applicants: NEC CORPORATION, Tokyo (JP); UNIVERSITY OF TSUKUBA, Tsukuba (JP)

(72) Inventors: Midori Shimura, Tokyo (JP); Shukichi Tanaka, Tokyo (JP); Toshie Miyamoto, Tokyo (JP); Masatoshi Iji, Ibaraki (JP)

(73) Assignees: NEC Corporation, Tokyo (JP); UNIVERSITY OF TSUKUBA, Tsukuba (JP)

( * ) Notice: Subject to any disclaimer, the term of this patent is extended or adjusted under 35 U.S.C. 154(b) by 183 days.

This patent is subject to a terminal disclaimer.

(21) Appl. No.: 18/136,931

(22) Filed: Apr. 20, 2023

(65) Prior Publication Data

US 2023/0272123 A1 Aug. 31, 2023

Related U.S. Application Data

(62) Division of application No. 17/258,955, filed as application No. PCT/JP2019/027350 on Jul. 10, 2019, now abandoned.

(30) Foreign Application Priority Data

Jul. 10, 2018 (JP) ................................. 2018-130984

(51) Int. Cl.
C08B 37/00 (2006.01)
(52) U.S. Cl.
CPC ................................ C08B 37/0024 (2013.01)
(58) Field of Classification Search
CPC .............................. C08B 3/16; C08B 37/0024
See application file for complete search history.

(56) References Cited

U.S. PATENT DOCUMENTS

| | | | |
|---|---|---|---|
| 2015/0299339 A1 | 10/2015 | Shibakami et al. | |
| 2016/0251452 A1 | 9/2016 | Toyama et al. | |
| 2018/0044440 A1 | 2/2018 | Shibakami et al. | |

FOREIGN PATENT DOCUMENTS

| JP | 2003227939 | * | 10/1991 |
|---|---|---|---|
| JP | 2014-037657 A | | 2/2014 |
| JP | 2014-098095 A | | 5/2014 |
| JP | 6029155 B2 | | 11/2016 |
| JP | 2017-179182 A | | 10/2017 |
| JP | 2017-193667 A | | 10/2017 |
| JP | 2017-218566 A | | 12/2017 |
| WO | 2014/077340 A1 | | 5/2014 |

OTHER PUBLICATIONS

Ochi Hirotomo, English translation of JPH03227939, "Immunological competence-activating substance and production thereof", published Oct. 1991 (Year: 1991).*

Motonari Shibakami, "Thickening and water-absorbing agent made from euglenoid polysaccharide", Carbohydrate Polymers, 2017, pp. 451-464, vol. 173.

Motonari Shibakami et al., "One-pot synthesis of thermoplastic mixed paramylon esters using trifluoroacetic anhydride", Carbohydrate Polymers, 2015, pp. 1-7, vol. 119.

Motonari Shibakami et al., "Synthesis and thermal properties of paramylon mixed esters and optical, mechanical, and crystal properties of their hot-pressed films", Carbohydrate Polymers, 2017, pp. 416-424, vol. 155.

Motonari Shibakami et al., "Thermoplasticization of euglenoid p-1,3-glticans by mixed esterification", Carbohydrate Polymers, 2014, pp. 90-96, vol. 105.

International Search Report of PCT/JP2019/027350 dated Aug. 13, 2019 [PCT/ISA/210].

Sohma M. et al., Carbohydrate Polymers, "Synthesis and thermal properties of paramylon mixed esters and optical, mechanical, and crystal properties of their hot-pressed films", 2017, vol. 155, pp. 416-424 (Year: 2017).

* cited by examiner

Primary Examiner — Bahar Craigo
(74) Attorney, Agent, or Firm — Sughrue Mion, PLLC

(57) ABSTRACT

A paramylon-based resin having a weight-average molecular weight of paramylon in a range of 70000 to 140000, and formed by substituting hydrogen atoms of hydroxy groups of a paramylon with a long-chain component being a linear saturated aliphatic acyl group having 14 or more carbon atoms and a short-chain component being an acyl group (acetyl group or/and propionyl group) having 2 or 3 carbon atoms, wherein a degree of substitution with the long-chain component ($DS_{Lo}$) and a degree of substitution with the short-chain component ($DS_{Sh}$) satisfy the following conditional expressions (1) and (2), Izod impact strength is 5.0 kJ/m² or more, and an MFR (melt flow rate at 210° C. and under a load of 5 kg) is 2 g/10 min or more. To provide a paramylon-based resin excellent in mechanical characteristics and thermoplasticity $$2.2 \leq DS_{Lo} + DS_{Sh} \leq 2.8 \quad (1)$$

$$5 \leq DS_{Sh}/DS_{Lo} \leq 25 \quad (2).$$

18 Claims, No Drawings

PARAMYLON-BASED RESIN, MOLDING MATERIAL, MOLDED BODY, AND METHOD FOR PRODUCING PARAMYLON-BASED RESIN

CROSS REFERENCE TO RELATED APPLICATIONS

This application is a Divisional of U.S. application Ser. No. 17/258,955, filed Jan. 8, 2021, which is a National Stage of International Application No. PCT/JP2019/027350, filed Jul. 10, 2019, claiming priority to Japanese Patent Application No. 2018-130984, filed Jul. 10, 2018, the contents of all of which are incorporated herein by reference in their entirety.

TECHNICAL FIELD

The present invention relates to a paramylon-based resin, a molding material and a molded body, and a method for producing a paramylon-based resin.

BACKGROUND ART

Bioplastics made from plant resources can contribute to countermeasures against petroleum depletion and global warming, and has been started being used in general products such as packaging, containers and fibers but also in durable products such as electronic equipment and automobiles.

However, since conventional bioplastics are made of edible components such as starch as raw materials, in view of concerns about food shortages in the future, the development of new bioplastics using non-edible plant components as raw materials is required.

As a non-edible plant component, cellulose, which is a main component of wood and vegetation, is typical, and bioplastics using the cellulose have been developed and partially commercialized.

Cellulose is produced by removing lignin and hemicellulose contained in wood or the like with an agent. Alternatively, since cotton is substantially made of cellulose, it can be used as it is. Cellulose, which is a polymer in which $\beta$-1,4 glucose is polymerized, is not thermoplastic because it has strong intermolecular forces due to hydrogen bonds derived from hydroxy groups. Also, except for special solvents, the solvent solubility is also low. Further, since it has a large number of hydroxy groups, which are hydrophilic groups, water absorption is high and water resistance is low.

Therefore, thermoplasticity is imparted by substituting a hydrogen atom of a hydroxy group of cellulose with a short-chain acyl group such as an acetyl group to reduce the intermolecular force of cellulose and further adding a plasticizer. Further, since only a short chain organic group such as an acetyl group is insufficient in thermoplasticity and water resistance, in addition to a short chain organic group, a long chain organic group having a larger number of carbon atoms has been introduced into cellulose. The introduced long-chain organic group functions as a hydrophobic internal plasticizer, and the thermoplasticity and water resistance of the cellulose derivative are improved.

Algal biomass has attracted attention as a plant raw material for non-edible components other than cellulose. Algae can be cultivated on lands that are not suitable for agricultural land, do not compete with food production, and can be cyclically cultivated by $CO_2$, nutrients, and sunlight. Therefore, it can be sustainably used as an alternative to fossil resources. In addition, algae can also produce useful organic components, especially long-chain fatty acids and polysaccharides, which are effective as major components of bioplastics, with high efficiency. As a polysaccharide derived from such algae, $\beta$-1,3 glucan (paramylon) is known. Paramylon is a polymer of glucose (degree of polymerization 700-750), and is characterized by being composed of only $\beta$-1,3 bonds. Like cellulose, paramylon is not thermoplastic because it has strong intermolecular forces due to hydrogen bonds derived from hydroxy groups.

For this reason, as for bioplastics using paramylon, a paramylon derivative having thermoplasticity has been developed by adding an acetyl group or a long-chain organic group to paramylon, like cellulose.

For example, Patent Document 1 describes a transparent fiber having an orientation property, which is mainly composed of a paramylon ester derivative in which at least one of hydroxy groups of paramylon is substituted with an alkyl carbonyl group.

In addition, Patent Document 2 describes a paramylon derivative in which hydroxy groups of paramylon are substituted with a short chain acyl group (containing a short chain aliphatic hydrocarbon group having 1 to 5 carbon atoms or a phenyl group) and a long chain acyl group (containing a long chain aliphatic hydrocarbon group having 13 or more carbon atoms). It is also described that this paramylon derivative has good thermoplasticity and is suitable for molding processing.

Patent Document 3 describes a paramylon derivative in which at least a part of hydroxy groups of paramylon and cardanol or a derivative thereof are bonded by an ester bond, an ether bond, or a urethane bond, and that this paramylon derivative has good thermoplasticity and is suitable for molding processing.

CITATION LIST

Patent Literature

Patent Literature 1: JP2017-218566A
Patent Literature 2: JP6029155B2 Patent Literature 3: JP2014-98095A

SUMMARY OF INVENTION

Technical Problem

An object of the present invention is to provide a paramylon-based resin excellent in mechanical characteristics and thermoplasticity, a molding material and a molded body using the same, and a method for producing a paramylon-based resin.

Solution to Problem

According to an aspect of the present invention, there is provided a paramylon-based resin having a weight-average molecular weight of paramylon in a range of 70000 to 140000, and formed by substituting hydrogen atoms of hydroxy groups of a paramylon with a long-chain component being a linear saturated aliphatic acyl group having 14 or more carbon atoms and a short-chain component being an acyl group (acetyl group or/and propionyl group) having 2 or 3 carbon atoms, wherein a degree of substitution with the long-chain component ($DS_{Lo}$) and a degree of substitution with the short-chain component ($DS_{Sh}$) satisfy the following conditional expressions (1) and (2):

$$2.2 \leq DS_{Lo} + DS_{Sh} \leq 2.8 \quad (1)$$

$$5 \leq DS_{Sh}/DS_{Lo} \leq 25 \quad (2),$$

Izod impact strength is 5.0 kJ/m² or more, and an MFR (melt flow rate at 210° C. and under a load of 5 kg) is 2 g/10 min or more.

According to another aspect of the present invention, there is provided a molding material comprising the above-mentioned paramylon-based resin.

According to another aspect of the present invention, there is provided a molded body formed by using the above-mentioned molding material.

According to another aspect of the present invention, there is provided a method for producing the paramylon-based resin according to any one of claims 1 to 3, comprising:

acylating hydroxy groups of a paramylon by reacting
the paramylon having a weight average molecular weight of 70000 to 140000 and dispersed in a solvent with
acetyl chloride or/and propionyl chloride, and
a long-chain reactant being an acid chloride of a long-chain fatty acid and comprising the long-chain component,
in the presence of the acid trapping component and under warming; and separating an acylated paramylon obtained in the acylating from the solvent.

Advantageous Effects of Invention

According to an exemplary embodiment of the present invention, it is possible to provide a paramylon-based resin excellent in mechanical characteristics and thermoplasticity, a molding material and a molded body using the same, and a method for producing a paramylon-based resin.

DESCRIPTION OF EMBODIMENTS

A paramylon-based resin according to an exemplary embodiment of the present invention is a paramylon derivative formed by substituting hydrogen atoms of hydroxy groups of a paramylon with a long-chain component which is a linear saturated aliphatic acyl group having 14 or more carbon atoms and a short-chain component which is an acyl group having 2 or 3 carbon atoms (acetyl group or/and propionyl group).

It is preferable that the degree of substitution with the long-chain component ($DS_{Lo}$) and the degree of substitution with the short-chain component ($DS_{Sh}$) satisfy the following conditional expressions (1) and (2):

$$2.2 \leq DS_{Lo} + DS_{Sh} \leq 2.8 \quad (1)$$

$$5 \leq DS_{Sh}/DS_{Lo} \leq 25 \quad (2)$$

In addition, $DS_{Lo}$ is particularly preferable in the range of 0.1 to 0.5, more preferably in the range of 0.1 to 0.4, and still more preferably in the range of 0.15 to 0.4. $DS_{Sh}$ is particularly preferable in the range of 2.0 to 2.5.

In the paramylon-based resin according to an exemplary embodiment of the present invention, the long-chain component and the short-chain component are introduced into a paramylon having a weight average molecular weight in the range of 70000 to 140000 by utilizing a hydroxy group of the paramylon. The weight average molecular weight (Mw) of the paramylon-based resin according to an exemplary embodiment of the present invention is preferably in the range of 100000 to 350000, more preferably in the range of 150000 to 350000. The molecular weights of the paramylon (before introduction of the long chain component and the short chain component) and the paramylon-based resin (after introduction of the long chain component and the short chain component) are values measured by GPC (gel permeation chromatography) under the following conditions.

(GPC Measurement Condition for Paramylon)
Column: PLgel 20 μm MIXED-A (product name, manufactured by Agilent Technology Japan, Ltd.)
Eluent: Dimethylacetamide (DMAc) Solution (0.1M LiCl)
Flow rate: 0.5 mL/min
Detector: RI (Refractive Index) (RI-71, manufactured by Tosoh Corporation)
Temperature: 23.0° C.
Standard sample: Pullulan standard (GPC Measurement Condition for Paramylon-Based Resin)
Column: SHIMPAC GPC-80MC×2 columns, GPC-8025C×1 columns (product name, manufactured by Shimadzu Corporation)
Eluent: Chloroform ($CHCl_3$)
Flow rate: 1.0 mL/min
Detector: RI (Refractive Index) (RID-10A, manufactured by Shimadzu Corporation)
Temperature: 40.0° C.
Standard sample: Polystyrene standard Such a paramylon-based resin can have excellent mechanical characteristics and thermoplasticity. As mechanical characteristics, for example, a resin having excellent impact resistance can be obtained. If the molecular weight of paramylon or paramylon-based resin is too low, mechanical characteristics such as impact resistance of a molded body using the produced resin may not be sufficient. On the contrary, if the weight average molecular weight of paramylon or paramylon-based resin is too high, the flowability of the produced resin becomes too low, interfering with molding in some cases.

By introducing the long-chain component, thermoplasticity and water resistance can be enhanced, and by having the long-chain component and the short-chain component in a specific ratio, mechanical characteristics such as bending strength, elastic modulus and impact resistance can be enhanced. The carbon number of the long-chain component is particularly preferably in the range of 16 to 22.

In the paramylon-based resin according to an exemplary embodiment of the present invention, from the viewpoints of flowability, water resistance, impact resistance, and the like, it is preferable that the average number of hydroxyl groups per glucose unit (hydroxy group remaining degree, $DS_{OH}$) is 0.8 or less.

The paramylon-based resin according to an exemplary embodiment of the present invention preferably has an Izod impact strength of 5.0 kJ/m² or more. In addition, the MFR (melt flow rate at 200° C. and under a load of 5 kg) of the paramylon-based resin according to an exemplary embodiment of the present invention is preferably 2 g/10 min or more. The Izod impact strength is a notched Izod impact strength measured according to JIS K7110. The MFR is preferably 2 g/10 min or more, more preferably 5 g/10 min or more, and more preferably 10 g/10 min or more from the viewpoint of preventing the flowability from becoming too low and hindering molding. The upper limit of the MFR is not particularly limited, but generally can be set to 200 g/10 min or less, set to 180 g/10 min or less, and set to 150 g/10 min or less. When the MFR is too large, the molecular weight of the resin tends to be low, and accordingly, the impact resistance tends to be low.

In the method for producing the paramylon-based resin according to an exemplary embodiment of the present invention, as the solvent, a solvent providing a liquid holding rate of 90 vol % or more by filter paper made of cotton fiber can be used. The acid trapping component preferably includes triethylamine or pyridine. The reaction temperature of the acylation step is preferably 50 to 100° C. The amount (mass ratio) of the solvent is preferably 10 to 50 times as large as the dry mass of the paramylon. In addition, the method may further include, after the above acylation step, a step of adding an alkaline aqueous solution and maintaining at 25 to 75° C. for 1 to 5 hours.

(Paramylon)

Paramylon is a straight-chain polymer obtained by polymerizing β-D-glucose (β-D-glucopyranose) molecules represented by the following formula (1) via β (1→3) glycoside bond. Each of glucose units constituting paramylon has three hydroxy groups (where n represents a natural number). In the exemplary embodiment, using these hydroxy groups, the short-chain organic group and long-chain organic group can be introduced into the paramylon.

[Formula 1]

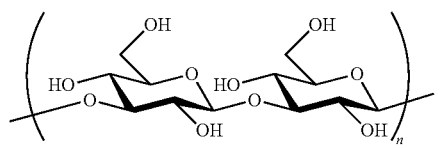

(1)

Paramylon is a major component of algae and is obtained by separating and treating other components such as protein from algae. Paramylon is a polysaccharide accumulated as a storage polysaccharide in *Euglena*, and is stored or consumed as an energy source by an environment such as nutritional conditions. It is known that paramylons consist solely of glucose, and the mean degree of polymerization of paramylons obtained from *Euglena gracilis* is about 700 to 750 in glucose units. The weight average molecular weight of paramylon measured by GPC is about 240000.

The weight average molecular weight of paramylon used in exemplary embodiments of the present invention is preferably in the range of 70000 to 140000, more preferably in the range of 70000 to 120000, and still more preferably in the range of 70000 to 100000. If the weight average molecular weight of paramylon is too low, the impact resistance of the produced resin may not be sufficient in some cases. On the contrary, if the weight average molecular weight is too high, the flowability of the produced resin becomes too low, interfering with molding in some cases. By hydrolyzing paramylon with acid or alkali, the molecular weight of paramylon can be adjusted. The molecular weight can be controlled by hydrolysis conditions.

Paramylon may be mixed with a similar structure material such as cellulose, chitin, chitosan, hemicellulose, xylan, glucomannan, curdlan, and the like. When such a similar structure material is mixed, the content of the similar structure material is preferably 30% by mass or less, preferably 20% by mass or less, and more preferably 10% by mass or less, based on the entire mixture.

The description in the above is directed to paramylon; however, the present invention is applicable to analogs of the paramylon, such as general non-edible polysaccharides, i.e., cellulose chitin, chitosan, hemicellulose, xylan, glucomannan and curdlan.

(Long-Chain Component)

The paramylon-based resin according to an exemplary embodiment of the present invention is a resin formed by introducing a long-chain component as mentioned above in addition to a short-chain component as mentioned above by use of a hydroxy group of a paramylon.

Such a long-chain component can be introduced by reacting a hydroxy group of a paramylon with a long-chain reactant. The long-chain component corresponds to an acyl group introduced in place of the hydrogen atom of a hydroxy group of a paramylon. A long-chain organic group of the long-chain component and a pyranose ring of a paramylon can be bound via an ester bond. The acyl group introduced is a linear saturated aliphatic acyl group having 14 or more carbon atoms. A linear saturated aliphatic acyl group having 14 to 30 carbon atoms is mentioned; a linear saturated aliphatic acyl group having 14 to 22 carbon atoms is preferable; and groups (tetradecanoyl group, hexadecanoyl group, octadecanoyl group, icosanoyl group, docosanoyl group) obtained by removing OH from a carboxyl group of myristic acid, palmitic acid, stearic acid, arachidic acid and behenic acid, are more preferable.

The long-chain reactant is a compound having at least one functional group capable of reacting with a hydroxy group of a paramylon; for example, a compound having a carboxyl group, a carboxylic acid halide group or a carboxylic acid anhydride group can be used.

As the long-chain reactant, for example, a long-chain carboxylic acid having 14 or more carbon atoms and an acid halide or acid anhydride of the long-chain carboxylic acid can be used. The saturation degrees of these carboxylic acids or carboxylic acid derivatives are desirably as high as possible; a linear saturated fatty acid, an acid halide or anhydride thereof is preferable. Examples of the long-chain carboxylic acid include linear saturated fatty acids such as myristic acid, pentadecylic acid, palmitic acid, margaric acid, stearic acid, arachidic acid, behenic acid, lignoceric acid, cerotic acid, montanic acid and melissic acid. Myristic acid, palmitic acid, stearic acid, arachidic acid and behenic acid are preferable. Further as the long-chain carboxylic acid, a carboxylic acid obtained from natural products is preferable, in view of environmental harmony.

The long-chain component has preferably 14 or more carbon atoms and particularly preferably 16 or more carbon atoms. In view of reaction efficiency in introducing a long-chain component, the long-chain component has preferably 48 or less carbon atoms, more preferably 36 or less carbon atoms and particularly preferably 22 or less carbon atoms. A single type of a long-chain component may be contained alone, or two types or more of long-chain components may be contained.

The average number of long-chain components introduced per glucose unit of a paramylon ($DS_{Lo}$) (long-chain component introduction ratio), in other words, the average number of hydroxy groups substituted with a long-chain component (a linear saturated aliphatic acyl group having 14 or more carbon atoms) per glucose unit (hydroxy group substitution degree), preferably satisfy the conditions represented by the above expressions (1) and (2). $DS_{Lo}$ can be set to fall within the range of, for example, 0.1 to 0.5, in accordance with the structure and introduction amount of a short-chain component, the structure of a long-chain component, physical properties required for a desired product and the production efficiency. In order to obtain a more sufficient introduction effect of a long-chain component, $DS_{Lo}$ is preferably 0.14 or more, more preferably 0.15 or more. In view of production efficiency and durability (e.g., strength, heat resistance), $DS_{Lo}$ is preferably 0.4 or less.

The properties of a paramylon or a derivative thereof can be improved by introducing a long-chain component as mentioned above into the cellulose or a derivative thereof. More specifically, water resistance, thermoplasticity and mechanical characteristics can be improved.

(Short-Chain Component)

The paramylon-based resin according to an exemplary embodiment of the present invention is a resin formed by introducing a short-chain component as mentioned above in addition to a long-chain component as mentioned above, using hydroxy groups of a paramylon. As a short chain component, an acetyl group or/and a propionyl group are preferred, and at least a propionyl group is preferably included, and a propionyl group is particularly preferred.

Such a short-chain component can be introduced by reacting a hydroxy group of a paramylon with a short-chain reactant. The short-chain component corresponds to an acyl group moiety introduced in place of a hydrogen atom of a hydroxy group of the paramylon. The short-chain organic group (methyl group or ethyl group) of a short-chain component and the pyranose ring of the paramylon can be bound via an ester bond.

The short-chain reactant is a compound having at least one functional group capable of reacting with a hydroxy group of a paramylon. Examples thereof include compounds having a carboxyl group, a carboxylic acid halide group and a carboxylic acid anhydride group. Specific examples thereof include an aliphatic monocarboxylic acid, an acid halide or acid anhydride thereof.

The short chain component preferably has 2 to 3 carbon atoms, more preferably 3 carbon atoms, and the hydrogen atom of a hydroxy group of the paramylon is preferably replaced with an acyl group having 2 to 3 carbon atoms (acetyl group, propionyl group), and more preferably replaced with an acyl group having at least 3 carbon atoms (propionyl group)

The average number of short-chain components introduced per glucose unit of a paramylon ($DS_{Sh}$) (short-chain component introduction ratio), in other words, the average number of hydroxy groups substituted with a short-chain component (acetyl group or/and propionyl group) per glucose unit (the substitution degree of hydroxy groups), preferably satisfy the conditions represented by the above expressions (1) and (2) (note that, $3 \geq DS_{Lo}+DS_{Sh}$). $DS_{Sh}$ can be set to fall within the range of 2.0 to 2.5. In order to obtain a more sufficient effect of introducing a short-chain component, $DS_{Sh}$ is preferably 2.0 or more. Particularly, in view of, e.g., water resistance and flowability, $DS_{Sh}$ is preferably 2.1 or more. In order to obtain the sufficient effect of a long-chain component in addition to the effect of introducing a short-chain component, $DS_{Sh}$ is preferably 2.5 or less, more preferably 2.4 or less and further preferably 2.3 or less.

By introducing the aforementioned short-chain component into a paramylon or a derivative thereof, the intermolecular force (intermolecular bond) of the paramylon can be reduced; and mechanical characteristics such as elastic modulus, chemical resistance and physical properties such as surface hardness can be enhanced.

As shown in Formula (2), the ratio ($DS_{Sh}/DS_{Lo}$) of the introduction ratio of the long-chain component to the introduction ratio of the short-chain component is preferably 5 or more and 25 or less. If the ratio is less than 5, the material tends to become too flexible and accordingly its strength and heat resistance tend to decrease. On the contrary, if the ratio exceeds 25, thermoplasticity becomes insufficient, with the result that it becomes unsuitable for molding applications. In these respects, $DS_{Sh}/DS_{Lo}$ is more preferably 5 or more, more preferably 6 or more, and is preferably 25 or less, more preferably 18 or less, and may be set to 10 or less.

As shown in Formula (1), the sum of the ratio of the long-chain component and the ratio of the short-chain component ($DS_{Lo}+DS_{Sh}$) is preferably 2.2 or more and 2.8 or less. From the viewpoint of obtaining adequate introduction effects of the long chain component and the short chain component, $DS_{Lo}+DS_{Sh}$ is preferably 2.2 or more, more preferably 2.3 or more, and is preferably 2.8 or less, more preferably 2.7 or less, from the viewpoint of mechanical characteristics and the like.

(Residual Amount of Hydroxy Groups of Paramylon-Based Resin)

As the residual amount of hydroxy groups increases, the maximum strength and heat resistance of the cellulose resin tend to increase; whereas water absorbability tends to increase. In contrast, as the conversion rate (degree of substitution) of hydroxy groups increases, water absorbability tends to decrease, plasticity and breaking strain tend to increase; whereas, maximum strength and heat resistance tend to decrease. In consideration of these tendencies etc., the conversion rate of hydroxy groups can be appropriately set.

The average number of the remaining hydroxy group per glucose unit (hydroxy group remaining degree, $DS_{OH}$) of a final paramylon-based resin can be set to fall within the range of 0 to 0.8 (note that, $DS_{Lo}+DS_{Sh}$ $DS_{OH}=3$). If $DS_{Lo}+DS_{Sh}$ is in the range of 2.2 to 2.8, $DS_{OH}$ can be set in the range of 0.2 to 0.8. In view of mechanical characteristics such as maximum strength and durability such as heat resistance, a hydroxy group may remain. For example, the hydroxy group remaining degree can be set at 0.01 or more and further 0.1 or more. Particularly, in view of flowability, the hydroxy group remaining degree of a final paramylon-based resin is preferably 0.1 or more and more preferably 0.2 or more. In view of, e.g., water resistance in addition to flowability, the hydroxy group remaining degree is preferably 0.8 or less. Further in view of, e.g., impact resistance in addition to water resistance, the hydroxy group remaining degree is preferably 0.6 or less and more preferably 0.5 or less.

(Activation of Paramylon)

Before the reaction step for introducing a long-chain component and a short-chain component into a paramylon, an activation treatment (pretreatment step) can be performed in order to increase the reactivity of the paramylon. As the activation treatment, an activation treatment which is routinely performed before acetylation of a paramylon can be applied.

In the activation treatment, a paramylon is swollen by bringing the paramylon into contact with a solvent, for example, by a method of spraying an activation solvent having affinity for a paramylon to the paramylon or by a method (soaking method) of soaking a paramylon in an activation solvent. Owing to the treatment, a reactant easily penetrates between paramylon molecular chains (if a solvent and a catalyst are used, a reactant easily penetrates together with these), with the result that the reactivity of the paramylon improves. Herein, examples of the activation solvent include water; carboxylic acids such as acetic acid, propionic acid, butyric acid, valeric acid, caproic acid, enanthic acid, caprylic acid, pelargonic acid and stearic acid; alcohols such as methanol, ethanol, propanol and isopropanol; nitrogen-containing compounds such as dimethylformamide, formamide, ethanolamine and pyridine; and sulfoxide compounds such as dimethylsulfoxide. These can be used in combination of two or more types. Particularly preferably, water, acetic acid, pyridine and dimethylsulfoxide can be used.

A paramylon can be activated by putting it in a long-chain fatty acid. If the melting point of the long-chain fatty acid is room temperature or more, a cellulose can be heated up to the melting point or more.

The use amount of activation solvent relative to a paramylon (100 parts by mass) can be set to be, for example, 10 parts by mass or more, preferably 20 parts by mass or more and more preferably 30 parts by mass or more. If a paramylon is soaked in an activation solvent, the use amount of activation solvent relative to the paramylon in term of mass, can be set to be, for example, the same or more, preferably 5 times or more and more preferably 10 times or more. In view of load for removing an activation solvent after the pretreatment and cost reduction of materials, the use amount of activation solvent is preferably 300 times or less, more preferably 100 times or less and further preferably 50 times or less.

The temperature of the activation treatment can be appropriately set within the range of, for example, 0 to 100° C. In view of the efficiency of activation and reduction of energy cost, the temperature is preferably 10 to 40° C. and more preferably 15 to 35° C.

When a cellulose is put in a melted long-chain fatty acid, the paramylon can be heated up to melting point or more of the long-chain fatty acid.

The time for the activation treatment can be appropriately set within the range of, for example, 0.1 hour to 72 hours. In order to perform sufficient activation and reduce the treatment time, the time is preferably 0.1 hour to 24 hours and more preferably 0.5 hours to 3 hours.

After the activation treatment, an excessive activation solvent can be removed by a solid-liquid separation method such as suction filtration, filter press and compression.

The activation solvent contained in a paramylon can be substituted with the solvent to be used in the reaction after the activation treatment. For example, a substitution treatment can be performed in accordance with the soaking method for an activation treatment mentioned above by changing the activation solvent to the solvent to be used in the reaction.

(Method for Introducing Long-Chain Component and Short-Chain Component)

A paramylon derivative (paramylon-based resin) according to an exemplary embodiment can be produced in accordance with the method shown below.

A process for producing a paramylon derivative according to an exemplary embodiment includes a step of acylating hydroxy groups of a paramylon constituting pulp by reacting, in a solvent, the paramylon dispersed in the solvent, a short-chain reactant (short-chain acylating agent) and a long-chain reactant (long-chain acylating agent) in the presence of an acid trapping component while warming. It is preferable that the short-chain reactant (short-chain acylating agent) and the long-chain reactant (long-chain acylating agent) are dissolved in the solvent. The acid trapping component may be also used as a solvent.

As a long-chain reactant for introducing a long-chain component into a paramylon, an acid chloride of a linear saturated fatty acid as mentioned above is preferable. A single type of a long-chain reactant may be used alone or two types or more of long-chain reactants may be used in combination. As a short-chain reactant for introducing a short-chain component into a paramylon, acetyl chloride or/and propionyl chloride are preferable, and propionyl chloride is more preferable.

The addition amounts of the long-chain reactant and short-chain reactant can be set in accordance with the degree of substitution ($DS_{Lo}$) with a long-chain component and the degree of substitution ($DS_{Sh}$) with a short-chain component in a desired paramylon derivative. If the short-chain reactant is excessively present, the binding amount of a long-chain component decreases and the degree of substitution ($DS_{Lo}$) with a long-chain component tends to decrease.

As the solvent, a solvent providing a liquid holding rate of 90 vol % or more by filter paper made of cotton fiber can be used.

The "liquid holding rate" can be measured as follows.

Filter paper (5B, 40 mmϕ, water content: about 2%) made of cotton fiber is soaked in each solvent at room temperature for one hour. The weights of the filter paper before and after soaking are measured and assigned to the following expression. In this manner, a liquid holding rate (vol %) is obtained. The weight of a sample after soaking is measured at the time when dripping of a solvent from the sample is stopped.

$$\text{Liquid holding rate (vol \%)}=(\text{weight after soaking}-\text{weight before soaking})/\text{weight before soaking}/\text{specific gravity of solvent}\times 100$$

Examples of a solvent providing a liquid holding rate of 90 vol % or more, include water (liquid holding rate: 145 vol %), acetic acid (liquid holding rate: 109 vol %), dioxane (liquid holding rate: 93 vol %), pyridine (liquid holding rate: 109 vol %), N-methyl pyrrolidone (liquid holding rate: 104 vol %), N,N-dimethylacetamide (liquid holding rate: 112 vol %), N,N-dimethylformamide (liquid holding rate: 129 vol %) and dimethylsulfoxide (liquid holding rate: 180 vol %).

An acid trapping component is not particularly limited as long as it is a base neutralizing an acid (e.g., hydrochloric acid, acetic acid, propionic acid) produced as a by-product. Examples thereof include alkaline metal hydroxides such as sodium hydroxide and potassium hydroxide; alkaline earth metal hydroxides such as calcium hydroxide and barium hydroxide; metal alkoxides such as sodium methoxide, sodium ethoxide; and nitrogen-containing nucleophilic compounds such as diazabicycloundecene, diazabicyclononene, triethylamine and pyridine. Of them, triethylamine and pyridine are preferable, and pyridine is particularly preferable since it can be used also as a solvent. When an acid trapping component is added independently of a solvent, it is preferable that the acid trapping component is present in a reaction system from the initiation time of a reaction. As long as an acid trapping component is present in a reaction system from the initiation time of a reaction, an acid trapping component may be added before or after addition of an acylating agent.

The addition amount of an acid trapping component relative to the total amount of a starting long-chain reactant (long-chain acylating agent) and a starting short-chain reactant (short-chain acylating agent) is preferably 0.1 to 10 equivalents and more preferably 0.5 to 5 equivalents. However, when a nitrogen-containing nucleophilic compound is used as a solvent, the addition amount of an acid trapping component is not limited the above range. If the addition amount of an acid trapping component is small, an acylation reaction efficiency decreases. In contrast, if the addition amount of an acid trapping component is large, the cellulose may be decomposed and sometimes reduced in molecular weight.

The reaction temperature in the acylation step is preferably 50 to 100° C. and more preferably 75 to 95° C. The reaction time can be set at 2 hours to 5 hours and preferably 3 hours to 4 hours. If the reaction temperature is sufficiently high, the reaction speed can be increased, with the result that an acylation reaction can be completed in a relative short time and the reaction efficiency can be increased. If the reaction temperature falls within the above range, a decrease in molecular weight by heating can be suppressed.

The amount of a solvent can be set to be 10 to 50 times and preferably 10 to 40 times (mass ratio) as large as the amount (dry mass) of the raw material paramylon.

(Aging Step)

After the above acylation step, an aqueous alkaline solution is added, and the reaction solution is preferably held (aged) as it is while warming. The temperature during the aging is preferably 25 to 75° C. and preferably 40 to 70° C. The time for aging can be set to fall within the range of 1 to 5 hours and preferably 1 to 3 hours.

The addition amount of an aqueous alkaline solution can be set so as to correspond to 3 to 30% by mass relative to the solvent to be used, and preferably 5 to 20% by mass.

As the aqueous alkaline solution, aqueous solutions of, e.g., potassium hydroxide, sodium carbonate and sodium hydrogen carbonate are mentioned, and an aqueous solution of sodium hydroxide is preferable. The concentration of an aqueous alkaline solution is preferably 1 to 30% by mass and more preferably 5 to 20% by mass.

Owing to such an aging step, the long-chain component and the short-chain component once bound are partially hydrolyzed to come back to (homogeneous) hydroxy groups, with the result that mechanical characteristics such as strength and impact resistance can be enhanced. In addition, in the following precipitation step, a product having satisfactory properties (fine granules) can be obtained.

(Recovery Step)

A paramylon derivative (product), which is formed by introducing a long-chain component and a short-chain component, can be recovered from a reaction solution in accordance with a recovery method generally used. The recovery method is not limited; however, if a product is not dissolved in a reaction solution, a solid-liquid separation method for separating a reaction solution and a product is preferable in view of production energy. If it is difficult to separate a solid and a liquid because a product is dissolved in or compatible with a reaction solution, the reaction solution is distilled off and a product can be recovered as the residue. Alternatively, a poor solvent for a product is added to the reaction solution to precipitate the product, which may be recovered by solid-liquid separation.

When a reaction solution is distillated, it is preferable to use a short-chain reactant, a reaction solvent and a catalyst having low boiling points. The catalyst can be removed from a product with, e.g., a washing solvent without distillation. When components except a product, such as a solvent, are distilled away from a reaction solution, distillation is stopped when a product is precipitated, and then, the remaining reaction solution and the precipitated product can be subjected to solid-liquid separation to recovery the product.

As the solid-liquid separation method, e.g., filtration (natural filtration, filtration under reduced pressure, pressure filtration, centrifugal filtration and these while applying heat), spontaneous sedimentation and flotation, separation (by funnel), centrifugal separation and squeeze, are mentioned. These can be used appropriately in combination.

A product (a paramylon derivative) dissolved in a filtrate after the solid-liquid separation can be precipitated by adding a poor solvent for the product and further subjected to solid-liquid separation to recover it.

The solid content (a paramylon derivative) recovered from a reaction solution is, if necessary washed and dried by a method generally employed.

The paramylon derivative produced by this method can possess a reinforcing crystal structure due to a paramylon main-chain crystal in a thermoplastic matrix. This is derived from an unreacted part when a paramylon material is acylated. Such a paramylon main-chain crystal can be evaluated, for example, by X-ray diffractometry. At the time of evaluation, for example, a paramylon derivative can be pressed to increase the density, thereby facilitating detection of a signal.

(Other Process for Producing Paramylon Derivative)

A paramylon resin can be obtained by acylating a paramylon in a solid-liquid heterogeneous system using a mixed acid anhydride containing a long-chain component and a short-chain component, as an acylating agent. Paramylon is preferably activated. The activation treatment can be performed by a method generally used.

Acylation can be carried out in a solvent which provides a liquid holding rate of 90% or more by a filter paper made of cotton fiber (for example, dioxane, in an amount of, e.g., 80 to 120 times as large as the dry weight of paramylon), in the presence of an acid catalyst (for example, sulfuric acid) while stirring at 45 to 65° C. for 2 to 5 hours. Thereafter, it is preferable that water is added to age the reaction solution for a few hours (for example, 1 to 3 hours) while heating (for example, 55 to 75° C.).

After completion of the reaction, a poor solvent such as a water/methanol solvent mixture, is added to allow a product dissolved in the liquid phase to sufficiently precipitate, and then, solid-liquid separation can be performed to recover a product. Thereafter, washing and drying can be made.

Acylation can be performed in a homogeneous solution system in which a paramylon and an acylating agent are homogenously dissolved in a solvent. A paramylon is preferably activated. The activation treatment can be performed by a method generally used.

As a solvent at the time of acylation, a solvent having high affinity for paramylon such as N,N-dimethylacetamide, pyridine, or N-methylpyrrolidinone is used.

As the acylating agent, a mixed acid anhydride having a long-chain component and a short-chain component, which is produced in the same solvent as the solvent to be used in acylation, can be used.

After completion of the reaction, a poor solvent such as methanol is added to precipitate a product, which may be recovered by solid-liquid separation. Thereafter, washing and drying can be made.

(Molding Resin Composition and Additives)

The paramylon derivative according to an exemplary embodiment can provide a resin composition suitable as a molding material by adding additives in accordance with desired properties. The paramylon derivative can be compatible with an additive which is compatible with a general paramylon derivative.

To the paramylon derivative according to an exemplary embodiment, various types of additives usually used in thermoplastic resins can be applied. For example, if a plasticizer is added, thermoplasticity and breaking elongation while breaking can be more improved. Examples of such a plasticizer include phthalic esters such as dibutyl phthalate, diaryl phthalate, diethyl phthalate, dimethyl phthalate, di-2-methoxyethyl phthalate, ethyl phthalyl ethyl glycolate and methyl phthalyl ethyl glycolate; tartaric acid esters such as dibutyl tartrate; adipic acid esters such as dioctyl adipate and diisononyl adipate; polyhydric alcohol esters such as triacetin, diacetyl glycerin, tripropionitrile glycerin and glyceryl monostearate; phosphoric acid esters such as triethyl phosphate, triphenyl phosphate and tricresyl phosphate; dibasic fatty acid esters such as dibutyl adipate, dioctyl adipate, dibutyl azelate, dioctyl azelate and dioctyl sebacate; citric acid esters such as triethyl citrate, acetyltriethyl citrate and tributyl acetylcitrate; epoxylated vegetable oils such as epoxylated soybean oil and epoxylated linseed oil; castor oil and a derivative thereof; benzoic acid esters such as ethyl O-benzoyl benzoate; aliphatic dicarboxylic acid esters such as sebacate and azelate; unsaturated dicarboxylic acid esters such as maleate; and N-ethyl toluene sulfonamide, triacetin, O-cresyl p-toluenesulfonate and tripropionin. Particularly of them, if a plasticizer such as dioctyl adipate, benzyl adipate-2 butoxyethoxyethyl, tricresyl phosphate, diphenylcresyl phosphate or diphenyl octyl phosphate is added, not only thermoplasticity and breaking elongation but also shock resistance can be effectively improved.

Examples of other plasticizers include cyclohexane dicarboxylic acid esters such as dihexyl cyclohexanedicarboxylate, dioctyl cyclohexanedicarboxylate and di-2-methyloctyl cyclohexanedicarboxylate; trimellitic acid esters such as dihexyl trimellitate, diethylhexyl trimellitate and dioctyl trimellitate; and pyromellitic acid esters such as dihexyl pyromellitate, diethylhexyl pyromellitate and dioctyl pyromellitate.

To the paramylon derivative according to an exemplary embodiment, if necessary, an inorganic or organic granular or fibrous filler can be added. By adding a filler, strength and rigidity can be more improved. Examples of the filler include, mineral particles (talc, mica, baked siliceous earth, kaolin, sericite, bentonite, smectite, clay, silica, quartz powder, glass beads, glass powder, glass flake, milled fiber, Wollastonite, etc.), boron-containing compounds (boron nitride, boron carbonate, titanium boride etc.), metal carbonates (magnesium carbonate, heavy calcium carbonate, light calcium carbonate, etc.), metal silicates (calcium silicate, aluminum silicate, magnesium silicate, magnesium aluminosilicate, etc.), metal oxides (magnesium oxide etc.), metal hydroxides (aluminum hydroxide, calcium hydroxide, magnesium hydroxide, etc.), metal sulfates (calcium sulfate, barium sulfate, etc.), metal carbides (silicon carbide, aluminum carbide, titanium carbide, etc.), metal nitrides (aluminum nitride, silicon nitride, titanium nitride, etc.), white carbon and metal foils. Examples of the fibrous filler include organic fibers (natural fiber, papers etc.), inorganic fibers (glass fiber, asbestos fiber, carbon fiber, silica fiber, silica alumina fiber, Wollastonite, zirconia fiber, potassium titanate fiber etc.) and metal fibers. These fillers can be used singly or in combination of two or more types.

To the paramylon derivative according to an exemplary embodiment, if necessary, a flame retardant can be added. By adding a flame retardant, flame resistance can be imparted. Examples of the flame retardant include metal hydrates such as magnesium hydroxide, aluminum hydroxide and hydrotalcite, basic magnesium carbonate, calcium carbonate, silica, alumina, talc, clay, zeolite, bromine-based flame retardant, antimony trioxide, phosphoric acid based flame retardant (aromatic phosphate, aromatic condensed phosphate, etc.), compounds containing phosphorus and nitrogen (phosphazene compound), etc. These flame retardants can be used singly or in combination with two or more types.

To the paramylon derivative according to an exemplary embodiment, if necessary, a shock resistance improver can be added. By adding a shock resistance improver, shock resistance can be improved. Examples of the shock resistance improver include a rubber component and a silicone compound. Examples of the rubber component include a natural rubber, epoxylated natural rubber and synthesized rubber. Furthermore, examples of the silicone compound include organic polysiloxane formed by polymerization of alkyl siloxane, alkyl phenyl siloxane, etc. and modified silicone compounds obtained by modifying a side chain or an end of an organic polysiloxane as mentioned above with polyether, methylstyryl, alkyl, higher fatty acid ester, alkoxy, fluorine, an amino group, an epoxy group, a carboxyl group, a carbinol group, a methacryl group, a mercapto group, a phenol group etc. These shock resistance improvers can be used singly or in combination of two or more types.

As the silicone compound, a modified silicone compound (modified polysiloxane compound) is preferred. As the modified silicone compound, a modified polydimethyl siloxane is preferred, which has a structure having a main chain constituted of dimethyl siloxane repeat units and a side chain or a terminal methyl group partly substituted with an organic substituent containing at least one group selected from an amino group, an epoxy group, a carbinol group, a phenol group, a mercapto group, a carboxyl group, a methacryl group, a long-chain alkyl group, an aralkyl group, a phenyl group, a phenoxy group, an alkyl phenoxy group, a long-chain fatty acid ester group, a long-chain fatty acid amide group and a polyether group. The modified silicone compound, because of the presence of such an organic substituent, is improved in affinity for the aforementioned paramylon derivative and dispersibility in the paramylon derivative is improved. Consequently, a resin composition excellent in shock resistance can be obtained.

As such a modified silicone compound, a modified silicone compound produced in accordance with a conventional method can be used.

Examples of the organic substituent contained in the modified silicone compound include the organic substituents represented by the following formulas (2) to (20) are mentioned:

[Formula 2]

(2)

(3)

[Formula 3]

(4)

(5)

(6)

-continued

[Formula 4]

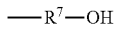 (7)

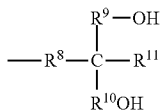 (8)

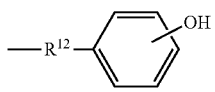 (9)

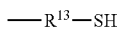 (10)

[Formula 5]

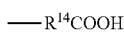 (11)

[Formula 6]

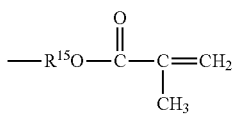 (12)

[Formula 7]

 (13)

[Formula 8]

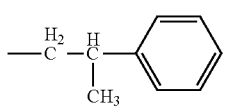 (14)

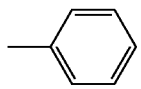 (15)

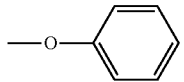 (16)

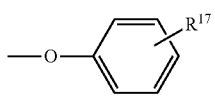 (17)

[Formula 9]

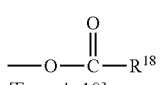 (18)

[Formula 10]

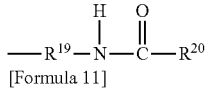 (19)

[Formula 11]

 (20)

where a and b each represent an integer of 1 to 50.

In the aforementioned formulas, $R^1$ to $R^{10}$, $R^{12}$ to $R^{15}$, $R^{19}$ and $R^{21}$ each represent a divalent organic group. Examples of the divalent organic group include alkylene groups such as a methylene group, an ethylene group, a propylene group and a butylene group; alkyl arylene groups such as a phenylene group and a tolylene group; oxyalkylene groups and polyoxyalkylene groups such as —($CH_2$—$CH_2$—O)c- (c represents an integer from 1 to 50), —[$CH_2$—$CH(CH_3)$—O]$_d$— (d represents an integer from 1 to 50), and —($CH_2$) e-NHCO— (e represents an integer from 1 to 8). Of these, an alkylene group is preferable and particularly, an ethylene group and a propylene group are preferable.

In the aforementioned formulas, $R^{11}$, $R^{16}$ to $R^{18}$, $R^{20}$ and $R^{22}$ each represent an alkyl group having at most 20 carbon atoms. Examples of the alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group and a pentadecyl group. Furthermore, the structures of the above alkyl groups may have one or more unsaturated bonds.

The total average content of organic substituents in a modified silicone compound desirably falls within the range where the modified silicone compound having an appropriate particle diameter (for example, 0.1 μm or more and 100 μm or less) can be dispersed in a matrix, i.e., a paramylon derivative, during a process for producing a paramylon derivative composition. If a modified silicone compound having an appropriate particle diameter is dispersed in a paramylon derivative, stress concentration on the periphery of a silicone region having a low elastic modulus effectively occurs. As a result, a resin molded body having excellent shock resistance can be obtained. The total average content of such organic substituents is preferably 0.01% by mass or more and more preferably 0.1% by mass or more, and also preferably 70% by mass or less and more preferably 50% by mass or less. If an organic substituent is contained appropriately, the modified silicone compound can be improved in affinity for a paramylon-based resin, the modified silicone compound having an appropriate particle diameter can be dispersed in a paramylon derivative, and further bleed out due to separation of the modified silicone compound in a molding can be suppressed. If the total average content of the organic substituents is excessively low, it becomes difficult to disperse a modified silicone compound having an appropriate particle diameter in a paramylon-based resin.

If an organic substituent of the modified polydimethyl siloxane compound is an amino group, an epoxy group, a carbinol group, a phenol group, a mercapto group, a carboxyl group or a methacryl group, the average content of the organic substituent in the modified polydimethyl siloxane compound can be obtained by the following Expression (I).

Organic substituent average content (%)=(organic substituent formula-weight/organic substituent equivalent)×100　　(I)

In the Expression (I), the organic substituent equivalent is an average mass of a modified silicone compound per organic substituent (1 mole).

When the organic substituent of the modified polydimethyl siloxane compound is a phenoxy group, an alkylphenoxy group, a long-chain alkyl group, an aralkyl group, a long-chain fatty acid ester group or a long-chain fatty acid amide group, the average content of the organic substituent of the modified polydimethyl siloxane compound can be obtained from the following Expression (II).

Organic substituent average content (%)= $x \times w / [(1-x) \times 74 + x \times (59+w)] \times 100$　　(II)

In the Expression (II), x is an average molar fraction of the organic substituent-containing a siloxane repeat unit relative to all siloxane repeat units of the modified polydimethyl siloxane compound; and w is the formula weight of the organic substituent.

In the case where the organic substituent of the modified polydimethyl siloxane compound is a phenyl group, the average content of the phenyl group in the modified polydimethyl siloxane compound can be obtained by the following Expression (III).

Phenyl group average content (%)=
154×x/[74×(1−x)+198×x]×100 　　　(III)

In the Expression (III), x is an average molar fraction of the phenyl group-containing siloxane repeat unit relative to all siloxane repeat units in the modified polydimethyl siloxane compound (A).

In the case where the organic substituent of the modified polydimethyl siloxane compound is a polyether group, the average content of the polyether group in the modified polydimethyl siloxane compound can be obtained by the following Expression (IV).

Polyether group average content (%)=HLB value/
20×100 　　　(IV)

In the Expression (IV), the HLB value represents the degree of affinity of a surfactant for water and oil, and is defined by the following Expression (V) based on the Griffin Act.

HLB value=20×(sum of formula weights of hydrophilic moieties/molecular weight) 　　　(V)

To the paramylon derivative of the exemplary embodiment, two or more modified silicone compounds having different affinities to the derivative may be added. In this case, dispersibility of a relative low-affinity modified silicone compound (A1) is improved by a relative high-affinity modified silicone compound (A2) to obtain a paramylon-based resin composition having even more excellent shock resistance. The total average content of an organic substituent of the relatively low-affinity modified silicone compound (A1) is preferably 0.01% by mass or more and more preferably 0.1% by mass or more and also preferably 15% by mass or less and more preferably 10% by mass or less. The total average content of an organic substituent of the relatively high-affinity modified silicone compound (A2) is preferably 15% by mass or more and more preferably 20% by mass or more and also preferably 90% by mass or less.

The blending ratio (mass ratio) of the modified silicone compound (A1) to the modified silicone compound (A2) can be set to fall within the range of 10/90 to 90/10.

In a modified silicone compound, dimethyl siloxane repeat units and organic substituent-containing siloxane repeat units each of which may be homologously and continuously connected, alternately connected or connected at random. A modified silicone compound may have a branched structure.

The number average molecular weight of a modified silicone compound is preferably 900 or more and more preferably 1000 or more, and also preferably 1000000 or less, more preferably 300000 or less and further preferably 100000 or less. If the molecular weight of a modified silicone compound is sufficiently large, loss by vaporization can be suppressed in kneading with a melted paramylon derivative during a process for producing a paramylon derivative composition. Furthermore, if the molecular weight of a modified silicone compound is appropriate (not excessively large), a uniform molding having good dispersibility can be obtained.

As the number average molecular weight, a value (calibrated by a polystyrene standard sample) obtained by measuring a 0.1% chloroform solution of a sample by GPC can be employed.

The addition amount of such a modified silicone compound is preferably, in view of obtaining sufficient addition effect, 1% by mass or more relative to the total paramylon derivative composition and more preferably 2% by mass or more. In view of sufficiently ensuring properties of a paramylon-based resin such as strength and suppressing bleed out, the addition amount of a modified silicone compound is preferably 20% by mass or less and more preferably 10% by mass or less.

By adding such a modified silicone compound to a paramylon derivative, the modified silicone compound having an appropriate particle diameter (for example, 0.1 to 100 µm) can be dispersed in the resin and the shock resistance of a resin composition can be improved.

To the paramylon derivative of the exemplary embodiment, if necessary, additives such as a colorant, an antioxidant and a heat stabilizer may be added as long as they are applied to conventional resin compositions.

To the paramylon derivative of the exemplary embodiment, if necessary, a general thermoplastic resin may be added.

As the thermoplastic resin, a polyester can be added and a straight-chain aliphatic polyester can be preferably used. As the straight-chain aliphatic polyester (Y), the following straight-chain aliphatic polyesters (Y1) and (Y2) are preferable, for example, polybutylene succinate, polybutylene succinate adipate and polycaprolactone can be mentioned.

(Y1) Straight-chain aliphatic polyester containing at least one of repeating units represented by the following formula (21) and formula (22)

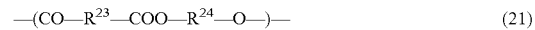
　　　(21)

　　　(22)

In the formula (21), $R^{23}$ represents a divalent aliphatic group having carbon atoms of 1 to 12, preferably 2 to 8 and more preferably 2 to 4; and $R^{24}$ represents a divalent aliphatic group having carbon atoms of 2 to 12, preferably 2 to 8 and more preferably 2 to 4.

In the formula (22), $R^{25}$ represents a divalent aliphatic group having carbon atoms of 2 to 10, preferably 2 to 8 and more preferably 2 to 4.

(Y2) Straight-chain aliphatic polyester composed of a product obtained by ring-opening polymerization of a cyclic ester.

The straight-chain aliphatic polyester (Y1) can be obtained by a condensation reaction between at least one selected from the group consisting of, for example, an aliphatic dicarboxylic acid, an acid anhydride thereof and a diester thereof, and an aliphatic diol.

The aliphatic dicarboxylic acid has carbon atoms of, for example, 3 to 12, preferably 3 to 9, more preferably 3 to 5. The aliphatic carboxylic acid is, for example, an alkane dicarboxylic acid. Specific examples thereof include malonic acid, succinic acid, adipic acid, sebacic acid, azelaic acid and dodecane dicarboxylic acid. The aliphatic dicarboxylic acids, for example, may be used alone or in combination of two or more.

The aliphatic diol has carbon atoms of, for example, 2 to 12, preferably 2 to 8 and more preferably 2 to 6. The aliphatic diol is, for example, an alkylene glycol. Specific examples thereof include ethylene glycol, 1,3-propylene glycol, 1,4-butane diol, 1,6-hexane diol, 1,9-nonane diol, 1,10-decane diol and 1,12-dodecane diol. Of them, a straight-chain aliphatic diol having 2 to 6 carbon atoms is preferable, and particularly, ethylene glycol, 1,3-propylene glycol, 1,4-butane diol and 1,6-hexane diol are preferable. The aliphatic diols, for example, may be used alone or in combination of two or more.

The straight-chain aliphatic polyester (Y2) is a straight-chain aliphatic polyester obtained by ring-opening polymerization of a cyclic ester. The cyclic ester is, for example, lactone having carbon atoms of 2 to 12. Specific examples thereof include, α-acetolactone, β-propiolactone, γ-butyrolactone and δ-valerolactone. The cyclic esters, for example, may be used alone or in combination with two or more.

The number average molecular weight of the straight-chain aliphatic polyester (Y) is not particularly limited. The lower limit thereof is preferably, for example, 10000 or more, and more preferably 20000 or more. The upper limit thereof is preferably, for example, 200000 or less and more preferably 100000 or less. The aliphatic polyester having a molecular weight within the above range can provide, for example, a more uniform molded body having more excellent dispersibility.

As the number average molecular weight, for example, a value (calibrated by a polystyrene standard sample) obtained by measuring a 0.1% chloroform solution of a sample by GPC can be employed.

By adding a thermoplastic resin having excellent flexibility such as a thermoplastic polyurethane elastomer (TPU) to the cellulose derivative according to an exemplary embodiment, shock resistance can be improved. The addition amount of such a thermoplastic resin (particularly, TPU) is, in view of obtaining sufficient addition effect, preferably 1% by mass or more and more preferably 5% by mass or more relative to the total composition containing the cellulose resin of the exemplary embodiment.

The thermoplastic polyurethane elastomer (TPU) suitable for improving shock resistance that can be used includes a polyurethane elastomer prepared by using a polyol, a diisocyanate and a chain extender.

Examples of the polyol include polyester polyol, polyester ether polyol, polycarbonate polyol and polyether polyol.

Examples of the polyester polyol include a polyester polyol obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a polyol such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,3-octane diol, 1,9-nonane diol, or a mixture of these; and a polylactone diol obtained by ring-opening polymerization of a lactone monomer such as ε-caprolactone.

Examples of the polyester ether polyol include a compound obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a glycol such as diethylene glycol or an alkylene oxide adduct (propylene oxide adduct etc.) or a mixture of these.

Examples of the polycarbonate polyol include a polycarbonate polyol obtained by reacting one or two or more polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol and diethylene glycol with diethylene carbonate, dimethyl carbonate, diethyl carbonate, etc.; and further may include a copolymer of a polycaprolactone polyol (PCL) and a polyhexamethylene carbonate (PHL).

Examples of the polyether polyol include a polyethylene glycol, polypropylene glycol and polytetramethylene ether glycol, each of which is obtained by polymerizing respective cyclic ethers: ethylene oxide, propylene oxide and tetrahydrofuran; and copolyethers of these.

Examples of the diisocyanate to be used in formation of TPU include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethyl xylene diisocyanate (TMXDI), 1,6,11-undecane triisocyanate, 1,8-diisocyanatemethyl octane, lysine ester triisocyanate, 1,3,6-hexamethylene triisocyanate, bicycloheptane triisocyanate and dicyclohexyl methane diisocyanate (hydrogenated MDI; HMDI). Of these, 4,4'-diphenylmethane diisocyanate (MDI) and 1,6-hexamethylene diisocyanate (HDI) are preferably used.

Examples of the chain extender to be used in formation of TPU, a low-molecular weight polyol can be used. Examples of the low-molecular weight polyol include aliphatic polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol, diethylene glycol and 1,4-cyclohexane dimethanol and glycerin; and aromatic glycols such as 1,4-dimethylolbenzene, bisphenol A and ethylene oxide or a propylene oxide adduct of bisphenol A.

When a silicone compound is copolymerized with a thermoplastic polyurethane elastomer (TPU) obtained from these materials, further excellent shock resistance can be obtained.

These thermoplastic polyurethane elastomers (TPU) may be used singly or in combination.

A process for producing a resin composition containing the paramylon derivative according to an exemplary embodiment, additives and a thermoplastic resin, is not particularly limited. For example, the resin composition can be produced by melting and mixing additives and the paramylon-based resin manually by handmixing or by use of a known mixer such as a tumbler mixer, or a ribbon blender, a single-axial or a multiaxial mixing extruder, and a compounding apparatus such as a kneader and kneading roll and, if necessary, granulating the mixture into an appropriate shape. In another preferable process, additives dispersed in solvent such as an organic solvent and a resin are mixed and furthermore, if necessary, a coagulation solvent is added to obtain a mixed composition of the additives and the resin and thereafter, the solvent is evaporated.

The paramylon-based resin according to the exemplary embodiments mentioned above can be used as a base resin for a molding material (resin composition). The molding material using the paramylon-based resin as a base resin is suitable for forming a molded body such as housing, e.g. packaging for an electronic device.

The base resin herein refers to a main component of the molding material and means that other components may be contained as long as the components do not prevent the function of the main component. The content rate of the main component is not particularly limited; however, the content rate of the main component in a composition is 50% by mass or more, preferably 70% by mass or more, more preferably 80% by mass or more and particularly preferably 90% by mass or more.

EXAMPLES

Hereinafter, the present invention will be described in more detail with reference to specific examples.
[Measurement of Weight Average Molecular Weight]
The weight average molecular weights of paramylons and paramylon-based resins were determined by GPC under the following conditions. The measurement results are shown in Table 1 to 3.
(GPC Measurement Condition for Paramylon)
- Column: PLgel 20 μm MIXED-A (product name, manufactured by Agilent Technology Japan, Ltd.)
- Eluent: Dimethylacetamide (DMAc) Solution (0.1 M LiCl)
- Flow rate: 0.5 mL/min
- Detector: RI (Refractive Index) (RI-71, manufactured by Tosoh Corporation)
- Temperature: 23.0° C.
- Standard sample: Pullulan standard
- Pump: LC-20AD, manufactured by Shimadzu Corporation
- Autosampler: SIL-20ACHT, manufactured by Shimadzu Corporation
- Column oven: CTO-20AC, manufactured by Tosoh Corporation (GPC Measurement Condition for Paramylon-Based Resin)
- Column: SHIMPAC GPC-80MC×2 columns, GPC-8025C×1 columns (product name, manufactured by Shimadzu Corporation)
- Eluent: Chloroform (CHCl$_3$)
- Flow rate: 1.0 mL/min
- Detector: RI (Refractive Index) (RID-10A, manufactured by Shimadzu Corporation)
- Temperature: 40.0° C.
- Standard sample: Polystyrene standard
- Pump: LC-20AD, manufactured by Shimadzu Corporation
- Autosampler: SIL-20A, manufactured by Shimadzu Corporation
- Column oven: CTO-20A, manufactured by Shimadzu Corporation Example 1

By treating the raw paramylon with an aqueous hydrochloric acid solution, paramylon 1 having an adjusted molecular weight was obtained. Next, paramylon 1 was acylated in a solid-liquid heterogeneous system to obtain a paramylon-based resin of this example. Specifically, the paramylon-based resin (paramylon propionate stearate) was prepared according to the following.

15 g of a raw material paramylon (weight average molecular weight: 242000) and 150 g of a 1% aqueous hydrochloric acid solution were put into a reactor, stirred at 100° C. for 4 hours, and then washed with water to obtain paramylon 1 having an adjusted molecular weight. The weight average molecular weight (Mw) of paramylon 1 was 139000.

4.5 g of paramylon 1 (in terms of dry mass, 27.8 mmol/glucose unit) was put into a reactor, dispersed in a mixture of 59 ml of N-methylpyrrolidone and 8.2 mL of pyridine under a nitrogen atmosphere, and stirred at room temperature overnight for activation.

Thereafter, the dispersion of paramylon was cooled to 10° C. or less, and 1.68 g (5.6 mmol) of stearoyl chloride and 7.70 g (83.3 mmol) of propionyl chloride were mixed in advance and charged into the reactor while maintaining 10° C. or less.

After stirring while heating at 90° C. for 4 hours, the mixture was cooled to 65° C., and 67 ml of methanol was added dropwise, and the mixture was stirred for about 30 minutes.

Further 15 ml of water was added to precipitate the product, which was collected by suction filtration. The resulting solid content was washed with 100 ml of a methanol/water mixture (9/1 v/v) until the color of the filtrate disappeared (5 times).

The washed solid content was dried under vacuum at 105° C. for 5 hours to obtain 9.44 g (yield 100%) of a powdery paramylon-based resin (paramylon propionate stearate)

The obtained paramylon-based resin (paramylon propionate stearate) was measured by $^1$H-NMR (AV-400, manufactured by Bruker Corporation, 400 MHz, solvent: CDCl$_3$), and as a result, $DS_{Lo}$ was 0.16, and $DS_{Sh}$ was 2.4.

Further, the paramylon-based resin was evaluated according to the following. The results are shown in Table 1.
[Measurement of Glass Transition Temperature (Tg)]
The glass transition temperature was determined by differential scanning calorimetry (DSC: Differential scanning calorimetry) under the following conditions. The measuring device used was EXSTAR2000, DSC6200, manufactured by Seiko Instruments Inc.

The paramylon-based resin was heated from 20° C. to 200° C. at 10° C./min, and then rapidly cooled from 200° C. to −30° C. at 50° C./min. Then, the glass transition temperature (Tg) was measured when the temperature was raised from −30° C. to 200° C. at 20° C./min.
[Preparation of the Injection Molded Body]
A molded body having the following shape was formed from the paramylon-based resin obtained above by using an injection molding machine (HAAKE MiniJet II, manufactured by Thermo Electron Corporation).

Size of the molded body: thickness: 2.4 mm, width: 12.4 mm, length: 80 mm

The molding was performed in the conditions: cylinder temperature of the molding machine: 220° C., temperature of a mold: 60° C., injection pressure: 1200 bar (120 MPa) for 5 seconds and holding pressure: 600 bar (60 MPa) for 20 seconds.
[Measurement of Bending Characteristics]
For the above-mentioned molded body, the bending test was carried out based on JIS K7171, the maximum bending stress, the flexural modulus, the bending elongation at break were measured.
[Measurement of Izod Impact Strength]
The molded bodies obtained above were subjected to measurement of notched Izod impact strength performed in the conditions described in JIS K7110.

The obtained data were evaluated in accordance with the following criteria.

Criteria for evaluation of Izod impact strength:
○: 5.0 kJ/m$^2$ or more
x: less than 5.0 kJ/m$^2$

[Measurement of Flowability (Melt Flow Rate (MFR))]

MFRs were measured using a high-pressure type flow tester (manufactured by Shimadzu Corporation, product name: CFT-500D) at temperatures of 210° C., under a load of 5 kg, a die of 2 mmφ×10 mm (diameter of hole 2 mm, length of hole 10 mm), and preheating of 2 minutes (period from the time when a sample is filled in a cylinder and a piston is inserted to the time when the load is applied), based on JIS7210:1990.

The obtained data were evaluated in accordance with the following criteria.

MFR evaluation criteria
◯: 2 g/10 min or more
x: less than 2 g/10 min

Example 2

15 g of a raw material paramylon (weight average molecular weight: 242000) and 150 g of a 3% aqueous hydrochloric acid solution were put into a reactor, stirred at 100° C. for 4 hours, and then washed with water to obtain paramylon 2 having an adjusted molecular weight. The weight average molecular weight (Mw) of paramylon 2 was 83700. A paramylon-based resin (paramylon propionate stearate) was prepared according to the same amount and method as in Example 1 except that paramylon 1 was changed to paramylon 2 (yield amount: 9.3 g, yield: 99%).

The obtained paramylon-based resin (paramylon propionate stearate) was measured by $^1$H-NMR in the same manner as in Example 1, and as a result, $DS_{Lo}$ was 0.14, and $DS_{Sh}$ was 2.4.

Further, this paramylon-based resin was evaluated for mechanical characteristics such as impact strength and flowability in the same manner as in Example 1. The results are shown in Table 1.

Example 3

15 g of a raw material paramylon (weight average molecular weight: 242000) and 150 g of a 3% aqueous hydrochloric acid solution were put into a reactor, stirred at 100° C. for 6 hours, and then washed with water to obtain paramylon 3 having an adjusted molecular weight. The weight average molecular weight (Mw) of paramylon 3 was 71200. A paramylon-based resin (paramylon propionate stearate) was prepared according to the same amount and method as in Example 1 except that paramylon 1 was changed to paramylon 3 (yield amount: 8.9 g, yield: 93%).

The obtained paramylon-based resin (paramylon propionate stearate) was measured by $^1$H-NMR in the same manner as in Example 1, and as a result, $DS_{Lo}$ was 0.16, and $DS_{Sh}$ was 2.5.

Further, this paramylon-based resin was evaluated for mechanical characteristics such as impact strength and flowability in the same manner as in Example 1. The results are shown in Table 1.

Comparative Example 1

A paramylon-based resin (paramylon propionate stearate) was prepared according to the same amount and method as in Example 1 except that the raw paramylon (weight average molecular weight 242000) was acylated without treatment with an aqueous hydrochloric acid solution (yield amount: 8.9 g, yield: 93%)

The obtained paramylon-based resin (paramylon propionate stearate) was measured by $^1$H-NMR in the same manner as in Example 1, and as a result, $DS_{Lo}$ was 0.16, and $DS_{Sh}$ was 2.3.

Further, this paramylon-based resin was evaluated for mechanical characteristics such as impact strength and flowability in the same manner as in Example 1. The results are shown in Table 1. Note that since the paramylon-based resin of Comparative Example 1 was not sufficiently dissolved in chloroform, GPC measurement could not be performed.

Table 1 summarizes the long-chain component (octadecanoyl group (corresponding to the acyl group portion contained in stearic acid)), the short-chain component (propionyl group) and degrees of substitution thereof, and evaluation results of mechanical characteristics such as impact strength and flowability of each paramylon-based resin (paramylon propionate stearate) produced.

[Table 1]

TABLE 1

| | Paramylon derivative | | | | | | | | | | | |
|---|---|---|---|---|---|---|---|---|---|---|---|---|
| | Paramylon | | | | | Degree of substitution | | Maximum bending stress [MPa] | Flexural modulus [GPa] | Bending elongation at break [%] | Tg [° C.] | Izod impact strength [kJ/m²] | MFR [g/10 min] |
| | | Molecular weight | | Molecular weight | | Long-chain | Short-chain | | | | | | |
| | Type | Mn | Mw | Mn | Mw | $DS_{Lo}$ | $DS_{Sh}$ | | | | | | |
| Example 1 | paramylon 1 | 45000 | 139000 | 125000 | 292000 | 0.16 | 2.4 | 51 | 1.3 | >10 | 92 | 6.4 ◯ | 5.3 ◯ |
| Example 2 | paramylon 2 | 32000 | 83700 | 105000 | 188000 | 0.14 | 2.4 | 49 | 1.3 | >10 | 90 | 6.3 ◯ | 23 ◯ |
| Example 3 | paramylon 3 | 29000 | 71200 | 98400 | 186000 | 0.16 | 2.5 | 48 | 1.3 | >10 | 88 | 8.4 ◯ | 44 ◯ |
| Comparative Example 1 | raw material paramylon | 69000 | 239000 | Not measurable | Not measurable | 0.16 | 2.3 | 57 | 1.4 | 9.9 | 99 | 2.4 x | Not measurable |

As shown in Table 1, it can be seen that the paramylon-based resins (paramylon derivatives) of the examples according to the exemplary embodiments of the present invention are all excellent in mechanical characteristics (impact strength and the like) and thermoplasticity (flowability: MFR).

On the other hand, it can be seen that the paramylon-based resin of Comparative Example 1 prepared using paramylon having a weight average molecular weight not in the range of 70000 to 140000 has high inhomogeneity of the product, reduced bending elongation at break, and inferior impact strength, and has insufficient thermoplasticity (flowability: MFR)

Example 4

A paramylon-based resin (paramylon propionate stearate) was prepared according to the same method as in Example 1 except that the amounts of the long-chain reactant and the short-chain reactant were changed to 3.36 g (11.1 mmol) of stearoyl chloride and 7.70 g (83.3 mmol) of propionyl chloride (yield amount: 8.3 g, yield: 82%).

The obtained paramylon-based resin (paramylon propionate stearate) was measured by $^1$H-NMR in the same manner as in Example 1, and as a result, $DS_{Lo}$ was 0.32, and $DS_{Sh}$ was 2.1.

Further, this paramylon-based resin was evaluated for mechanical characteristics such as impact strength and flowability in the same manner as in Example 1. The results are shown in Table 2. Note that since the obtained paramylon-based resin was not sufficiently dissolved in chloroform, GPC measurement could not be performed.

Example 5

A paramylon-based resin (paramylon propionate stearate) was prepared according to the same method as in Example 1 except that the amounts of the long-chain reactant and the short-chain reactant were changed to 2.10 g (6.90 mmol) of stearoyl chloride and 6.41 g (69.4 mmol) of propionyl chloride (yield amount: 9.3 g, yield: 96%)

The obtained paramylon-based resin (paramylon propionate stearate) was measured by $^1$H-NMR in the same manner as in Example 1, and as a result, $DS_{Lo}$ was 0.27, and $DS_{Sh}$ was 2.1.

Further, this paramylon-based resin was evaluated for mechanical characteristics such as impact strength and flowability in the same manner as in Example 1. The results are shown in Table 2. Note that since the obtained paramylon-based resin was not sufficiently dissolved in chloroform, GPC measurement could not be performed.

Example 6

A paramylon-based resin (paramylon propionate stearate) was prepared according to the same method as in Example 1 except that the amounts of the long-chain reactant and the short-chain reactant were changed to 0.84 g (2.80 mmol) of stearoyl chloride and 7.70 g (83.3 mmol) of propionyl chloride (yield amount: 9.3 g, yield: 95%).

The obtained paramylon-based resin (paramylon propionate stearate) was measured by $^1$H-NMR in the same manner as in Example 1, and as a result, $DS_{Lo}$ was 0.10, and $DS_{Sh}$ was 2.5.

Further, this paramylon-based resin was evaluated for mechanical characteristics such as impact strength and flowability in the same manner as in Example 1. The results are shown in Table 2.

Example 7

A paramylon-based resin (paramylon propionate stearate) was prepared according to the same method as in Example 1, except that paramylon 2 was used instead of paramylon 1, and the amounts of the long-chain reactant and the short-chain reactant were changed to 3.36 g (11 1mmol) of stearoyl chloride and 7.70 g (83 3 mmol) of propionyl chloride (yield amount: 9.0 g, yield: 89%) The obtained paramylon-based resin (paramylon propionate stearate) was measured by $^1$H-NMR in the same manner as in Example 1, and as a result, $DS_{Lo}$ was 0.30, and $DS_{Sh}$ was 2.1.

Further, this paramylon-based resin was evaluated for mechanical characteristics such as impact strength and flowability in the same manner as in Example 1. The results are shown in Table 2.

Example 8

A paramylon-based resin (paramylon propionate stearate) was prepared according to the same method as in Example 1, except that paramylon 3 was used instead of paramylon 1, and the amounts of the long-chain reactant and the short-chain reactant were changed to 3.36 g (11 1mmol) of stearoyl chloride and 7.70 g (83 3 mmol) of propionyl chloride (yield amount: 9.5 g, yield: 91%)

The obtained paramylon-based resin (paramylon propionate stearate) was measured by $^1$H-NMR in the same manner as in Example 1, and as a result, $DS_{Lo}$ was 0.35, and $DS_{Sh}$ was 2.2.

Further, this paramylon-based resin was evaluated for mechanical characteristics such as impact strength and flowability in the same manner as in Example 1. The results are shown in Table 2.

Comparative Example 2

A paramylon-based resin (paramylon propionate stearate) was prepared according to the same method as in Example 1, except that the raw paramylon was acylated without treatment with an aqueous hydrochloric acid solution, and the amounts of the long-chain reactant and the short-chain reactant were changed to 3.99 g (13.2 mmol) of stearoyl chloride and 8.54 g (92.3 mmol) of propionyl chloride (yield amount: 8.5 g, yield: 83%).

The obtained paramylon-based resin (paramylon propionate stearate) was measured by $^1$H-NMR in the same manner as in Example 1, and as a result, $DS_{Lo}$ was 0.31, and $DS_{Sh}$ was 2.2.

Further, this paramylon-based resin was evaluated for mechanical characteristics such as impact strength and flowability in the same manner as in Example 1. The results are shown in Table 2. Note that since the obtained paramylon-based resin was not sufficiently dissolved in chloroform, GPC measurement could not be performed.

Comparative Example 3

A paramylon-based resin (paramylon propionate stearate) was prepared according to the same method as in Example 1, except that paramylon 2 was used instead of paramylon 1, and the amounts of the long-chain reactant and the short-chain reactant were changed to 6.73 g (22.2 mmol) of stearoyl chloride and 7.70 g (83.3 mmol) of propionyl chloride (yield amount: 11.4 g, yield: 96%).

The obtained paramylon-based resin (paramylon propionate stearate) was measured by $^1$H-NMR in the same manner as in Example 1, and as a result, $DS_{Lo}$ was 0.60, and $DS_{Sh}$ was 1.9. Further, this paramylon-based resin was evaluated for mechanical characteristics such as impact strength and flowability in the same manner as in Example 1. The results are shown in Table 2.

Comparative Example 4

A paramylon-based resin (paramylon propionate stearate) was prepared according to the same method as in Example 1, except that paramylon 2 was used instead of paramylon 1, and the amounts of the long-chain reactant and the short-chain reactant were changed to 1.68 g (5.60 mmol) of stearoyl chloride and 6.16 g (66.6 mmol) of propionyl chloride (yield amount: 8.1 g, yield: 92%)

The obtained paramylon-based resin (paramylon propionate stearate) was measured by $^1$H-NMR in the same manner as in Example 1, and as a result, $DS_{Lo}$ was 0.16, and $DS_{Sh}$ was 2.0.

Further, this paramylon-based resin was evaluated for mechanical characteristics such as impact strength and flowability in the same manner as in Example 1. The results are shown in Table 2.

to 140000, if the addition amount ($DS_{Lo}$) of long chain is too high as in Comparative Example 3, the flexibility is increased, so that the maximum bending stress, the flexural modulus, and the heat resistance (Tg) decrease.

On the contrary, it can be seen that, when the addition amount of long chain ($DS_{Lo}$) is low as in Comparative Example 4, and the addition amount of long chain and short chain ($DS_{Lo}+DS_{Sh}$) is small, impact resistance and thermoplasticity (flowability: MFR) are lowered.

Example 9

A paramylon-based resin (paramylon acetate stearate) was prepared according to the same method as in Example 1, except that paramylon 3 was used instead of paramylon 1, the amount of stearoyl chloride was changed to 4.20 g (13.9 mmol), and further, the short-chain reactant was changed to 6.54 g (83.3 mmol) of acetyl chloride (yield amount: 9.5 g, yield: 97%).

TABLE 2

| | Paramylon derivative | | | | | | | | | | | |
|---|---|---|---|---|---|---|---|---|---|---|---|---|
| | Paramylon | | | | | Degree of substitution | | Maximum | | Bending | | Izod | |
| | | | | | | Long-chain | Short-chain | bending | Flexural | elongation | | impact | |
| | | Molecular weight | | Molecular weight | | | | stress | modulus | at break | Tg | strength | MFR |
| | Type | Mn | Mw | Mn | Mw | $DS_{Lo}$ | $DS_{Sh}$ | [MPa] | [GPa] | [%] | [° C.] | [kJ/m$^2$] | [g/10 min] |
| Example 4 | paramylon 1 | 45000 | 139000 | Not measurable | Not measurable | 0.32 | 2.1 | 35 | 0.89 | >10 | 81 | 6.2 ○ | 5.6 ○ |
| Example 5 | paramylon 1 | 45000 | 139000 | Not measurable | Not measurable | 0.27 | 2.1 | 45 | 1.1 | >10 | 87 | 5.5 ○ | 2.1 ○ |
| Example 6 | paramylon 1 | 45000 | 139000 | 117000 | 232000 | 0.10 | 2.5 | 63 | 1.6 | >10 | 102 | 6.3 ○ | 2.5 ○ |
| Example 7 | paramylon 2 | 32000 | 83700 | 115000 | 274000 | 0.30 | 2.1 | 36 | 0.93 | >10 | 82 | 7.4 ○ | 46 ○ |
| Example 8 | paramylon 3 | 29000 | 71200 | 107000 | 206000 | 0.35 | 2.2 | 35 | 0.94 | >10 | 80 | 12 ○ | 177 ○ |
| Comparative Example 2 | raw material paramylon | 69000 | 239000 | Not measurable | Not measurable | 0.31 | 2.2 | 41 | 0.97 | >10 | 83 | 6.7 ○ | 1.7 x |
| Comparative Example 3 | paramylon 2 | 32000 | 83700 | 95700 | 180000 | 0.60 | 1.9 | 16 | 0.42 | >10 | 10 | 10 ○ | 169 ○ |
| Comparative Example 4 | paramylon 2 | 32000 | 83700 | 59000 | 97000 | 0.16 | 2.0 | 51 | 1.3 | >10 | 100 | 2.4 x | Not measurable |

As shown in Table 2, it can be seen that the paramylon-based resins (paramylon derivatives) of the examples according to the exemplary embodiments of the present invention are all excellent in mechanical characteristics (impact strength and the like) and thermoplasticity (flowability: MFR).

On the other hand, it can be seen that, although the paramylon-based resin of Comparative Example 2 prepared using paramylon having a weight-average molecular weight not in the range of 70000 to 140000 has the similar addition amounts of long and short chains ($DS_{Lo}$, $DS_{Sh}$) to those of Example 4, the thermoplasticity (flowability: MFR) is low because the molecular weight of the paramylon is higher than that of Example 4 (as a result, the molecular weight of the obtained paramylon-based resin is also high).

Further, it can be seen that, even if the weight-average molecular weight of paramylon is within the range of 70000

The obtained paramylon-based resin (paramylon acetate stearate) was measured by $^1$H-NMR in the same manner as in Example 1, and as a result, $DS_{Lo}$ was 0.32, and $DS_{Sh}$ was 2.4.

Further, this paramylon-based resin was evaluated for mechanical characteristics such as impact strength and flowability in the same manner as in Example 1. The results are shown in Table 3.

Example 10

A paramylon-based resin (paramylon acetate propionate stearate) was prepared according to the same method as in Example 1, except that paramylon 3 was used instead of paramylon 1, the amount of stearoyl chloride was changed to 4.20 g (13.9 mmol), and further, the short chain reactant was changed to 3.27 g (41.6 mmol) of acetyl chloride and 3.85 g (41.6 mmol) of propionyl chloride (yield amount: 10.2 g, yield: 97%).

The obtained paramylon-based resin (paramylon acetate propionate stearate) was measured by $^1$H-NMR in the same manner as in Example 1, and as a result, $DS_{Lo}$ was 0.31, $DS_{Sh}$ of acetyl group (Ac) was 1.4, and $DS_{Sh}$ of propionyl group (Pr) was 0.88.

Further, this paramylon-based resin was evaluated for mechanical characteristics such as impact strength and flowability in the same manner as in Example 1. The results are shown in Table 3.

Comparative Example 5

A paramylon-based resin (paramylon acetate stearate) was prepared according to the same method as in Example 1, except that the raw paramylon was acylated without treating with an aqueous hydrochloric acid solution, the amount of stearoyl chloride was changed to 4.44 g (14.6 mmol), and further, the short-chain reactant was changed to 6.90 g (87.9 mmol) of acetyl chloride (yield amount: 8.5 g, yield: 94%).

The obtained paramylon-based resin (paramylon acetate stearate) was measured by $^1$H-NMR in the same manner as in Example 1, and as a result, $DS_{Lo}$ was 0.26, and $DS_{Sh}$ was 2.2.

Further, this paramylon-based resin was evaluated for mechanical characteristics such as impact strength and flowability in the same manner as in Example 1. The results are shown in Table 3. Note that since the obtained paramylon-based resin was not sufficiently dissolved in chloroform, GPC measurement could not be performed.

Comparative Example 6

A paramylon-based resin (paramylon acetate propionate stearate) was prepared according to the same process as in Example 1, except that the raw paramylon was acylated without treating with an aqueous hydrochloric acid solution, the amount of stearoyl chloride was changed to 3.74 g (12.3 mmol), and further, the short chain reactant was changed to 2.90 g (36.9 mmol) of acetyl chloride and 3.42 g (37.0 mmol) of propionyl chloride (yield amount: 9.3 g, yield: 96%).

The obtained paramylon-based resin (paramylon acetate propionate stearate) was measured by $^1$H-NMR in the same manner as in Example 1, and as a result, $DS_{Lo}$ was 0.35, $DS_{Sh}$ of acetyl group (Ac) was 1.2, and $DS_{Sh}$ of the propionyl group (Pr) was 0.72.

Further, this paramylon-based resin was evaluated for mechanical characteristics such as impact strength and flowability in the same manner as in Example 1. The results are shown in Table 3. Note that since the obtained paramylon-based resin was not sufficiently dissolved in chloroform, GPC measurement could not be performed.

TABLE 3

| | Paramylon | | | Paramylon derivative | | | | | | | | | | |
|---|---|---|---|---|---|---|---|---|---|---|---|---|---|---|
| | | | | Molecular weight | | Degree of substitution | | | Maximum bending stress [MPa] | Flexural modulus [GPa] | Bending elongation at break [%] | Tg [° C.] | Izod impact strength [kJ/m²] | MFR [g/10 min] |
| | Type | Mn | Mw | Mn | Mw | Long-chain $DS_{Lo}$ | Short-chain (Pr) $DS_{Sh}$ | Short-chain (Ac) $DS_{Sh}$ | | | | | | |
| Example 9 | paramylon 3 | 32000 | 83700 | 89000 | 296000 | 0.32 | — | 2.4 | 59 | 1.5 | >10 | 119 | 5.0 ○ | 31 ○ |
| Example 10 | paramylon 3 | 32000 | 83700 | 68000 | 157000 | 0.31 | 0.88 | 1.4 | 44 | 1.1 | >10 | 102 | 5.0 ○ | 29 ○ |
| Comparative Example 5 | raw material paramylon | 69000 | 239000 | Not measurable | Not measurable | 0.26 | — | 2.2 | 72 | 1.7 | 9.4 | 137 | 2.2 × | Not measurable |
| Comparative Example 6 | raw material paramylon | 69000 | 239000 | Not measurable | Not measurable | 0.35 | 0.72 | 1.2 | 51 | 1.2 | >10 | 106 | 4.1 x | Not measurable |

As shown in Table 3, it can be seen that the paramylon-based resins (paramylon derivatives) of the examples according to the exemplary embodiments of the present invention are all excellent in mechanical characteristics (impact strength and the like) and thermoplasticity (flowability: MFR)

On the other hand, it can be seen that, although the paramylon-based resins of Comparative Examples 5 and 6 prepared using paramylon having a weight average molecular weight not in the range of 70000 to 140000 have similar addition amounts of short and long chains to those of Examples 9 and 10, respectively, the impact resistance and the thermoplasticity (flowability: MFR) are low because the molecular weight of the paramylon is too high.

Example 11

15 g of raw material paramylon (weight average molecular weight: 242000) and 150 g of a 5% aqueous hydrochloric acid solution were put into a reactor, stirred at 90° C. for 4 hours, and then washed with water to obtain paramylon 4 having an adjusted molecular weight. The weight average molecular weight (Mw) of paramylon 4 was 96700.

A paramylon-based resin (paramylon propionate palmitate) was prepared according to the same method as in Example 1, except that paramylon 1 was changed to paramylon 4, the amount of the mixed liquid was changed to 51 mL of N-methylpyrrolidone and 7.1 mL of pyridine, and the long-chain reactant was changed to 3.05 g (11.1 mmol) of palmitoyl chloride (yield amount: 9.9 g, yield: 100%).

The obtained paramylon-based resin (paramylon propionate palmitate) was measured by $^1$H-NMR in the same manner as in Example 1, and as a result, $DS_{Lo}$ was 0.26, and $DS_{Sh}$ was 2.3.

Further, this paramylon-based resin was evaluated for mechanical characteristics such as impact strength and flowability in the same manner as in Example 1. The results are shown in Table 4.

Example 12

A paramylon-based resin (paramylon propionate myristate) was prepared according to the same method as in Example 1, except that paramylon 1 was changed to paramylon 4, the amount of the mixed liquid was changed to 51 mL of N-methylpyrrolidone and 7.1 mL of pyridine, and the long-chain reactant was changed to 2.74 g (11.1 mmol) of myristoyl chloride (yield amount: 9.3 g, yield: 95%).

The obtained paramylon-based resin (paramylon propionate myristate) was measured by $^1$H-NMR in the same manner as in Example 1, and as a result, $DS_{Lo}$ was 0.29, and $DS_{Sh}$ was 2.4.

Further, this paramylon-based resin was evaluated for mechanical characteristics such as impact strength and flowability in the same manner as in Example 1. The results are shown in Table 4.

paramylon with a long-chain component being a linear saturated aliphatic acyl group having 14 or more and 48 or less carbon atoms and a short-chain component being an acyl group (acetyl group or/and propionyl group) having 2 or 3 carbon atoms,
wherein a degree of substitution with the long-chain component ($DS_{Lo}$) and a degree of substitution with the short-chain component ($DS_{Sh}$) satisfy the following conditional expressions (1) and (2):

$$2.2 \leq DS_{Lo} + DS_{Sh} \leq 2.8 \quad (1)$$

$$5 \leq DS_{Sh}/DS_{Lo} \leq 25 \quad (2),$$

Izod impact strength is 5.0 kJ/m² or more, and
an MFR (melt flow rate at 210° C. and under a load of 5 kg) is 2 g/10 min or more;
said method comprising:
controlling the molecular weight of the paramylon by hydrolyzing it with acid or alkali to form the paramylon having the weight-average molecular weight of 70000 to 140000,
acylating hydroxy groups of the paramylon by reacting the paramylon having the weight average molecular weight of 70000 to 140000 and dispersed in a solvent with
a short-chain reactant being acetyl chloride or/and propionyl chloride, and
a long-chain reactant being an acid chloride of a long-chain fatty acid and comprising the long-chain component,

TABLE 4

| | Paramylon | | Paramylon derivative | | Degree of substitution | | Maximum bending stress [MPa] | Flexural modulus [GPa] | Bending elongation at break [%] | Tg [° C.] | Izod impact strength [kJ/m²] | MFR [g/10 min] |
|---|---|---|---|---|---|---|---|---|---|---|---|---|
| | Molecular weight | | Molecular weight | | Long-chain $DS_{Lo}$ | Short-chain (Pr) $DS_{Sh}$ | | | | | | |
| Type | Mn | Mw | Mn | Mw | | | | | | | | |
| Example 11 paramylon 4 | 40400 | 96700 | 82000 | 157000 | 0.26 | 2.3 | 35 | 0.94 | >10 | 81 | 8.6 ○ | 148 ○ |
| Example 12 paramylon 4 | 40400 | 96700 | 107000 | 220000 | 0.29 | 2.4 | 39 | 1.1 | >10 | 79 | 7.5 ○ | 223 ○ |

As shown in Table 4, it can be seen that the paramylon-based resins (paramylon derivatives) of the examples according to the exemplary embodiments of the present invention are all excellent in mechanical characteristics (impact strength and the like) and thermoplasticity (flowability: MFR).

Having thus described the present invention with reference to the exemplary embodiments and Examples, the present invention is not limited to the above-described exemplary embodiments and Examples. Various modifications understandable to those skilled in the art may be made to the constitution and details of the present invention within the scope thereof.

The invention claimed is:

1. A method for producing a paramylon-based resin using paramylon having a weight-average molecular weight of paramylon in a range of 70000 to 140000, and formed by substituting hydrogen atoms of hydroxy groups of the in the presence of an acid trapping component and under warming, thereby forming an acylated paramylon as the paramylon-based resin, in which hydrogen atoms of hydroxy groups of the paramylon are substituted with the short-chain component and the long-chain component; and separating the acylated paramylon obtained in the acylating from the solvent, and wherein the acid trapping component comprises an alkaline metal hydroxide, an alkaline earth metal hydroxide, a metal alkoxide, or a nitrogen-containing nucleophilic compound.

2. The method for producing the paramylon-based resin according to claim 1, wherein the solvent is at least one selected from the group consisting of water, acetic acid, dioxane, pyridine, N-methylpyrrolidone, N,N-dimethylformamide, and dimethyl sulfoxide.

3. The method for producing the paramylon-based resin according to claim 1, wherein the acid trapping component comprises triethylamine or pyridine.

4. The method for producing the paramylon-based resin according to claim 1, wherein an amount of the solvent is 10 to 40 times as large as the dry mass of the paramylon.

5. The method for producing the paramylon-based resin according to claim 1, wherein the solvent comprises N-methylpyrrolidone, pyridine, or dioxane.

6. The method for producing the paramylon-based resin according to claim 1, wherein the solvent comprises N-methylpyrrolidone.

7. The method for producing the paramylon-based resin according to claim 1, wherein the acid trapping component comprises an alkaline metal hydroxide, an alkaline earth metal hydroxide, a metal alkoxide, diazabicycloundecene, diazabicyclononene, triethylamine, or pyridine.

8. The method for producing the paramylon-based resin according to claim 1, wherein the acid trapping component comprises sodium hydroxide, potassium hydroxide, calcium hydroxide, barium hydroxide, sodium methoxide, sodium ethoxide, diazabicycloundecene, diazabicyclononene, triethylamine, or pyridine.

9. The method for producing the paramylon-based resin according to claim 1, wherein the acid trapping component comprises pyridine.

10. The method for producing the paramylon-based resin according to claim 1, wherein an amount of the acid trapping component added relative to the total amount of the long-chain reactant and the short-chain reactant is 0.1 to 10 equivalents.

11. The method for producing the paramylon-based resin according to claim 1, wherein a reaction temperature in the acylating is 50 to 100° C.

12. The method for producing the paramylon-based resin according to claim 1, further comprising subsequent to controlling the molecular weight, and prior to acylating the hydroxy groups:
dispersing the paramylon with an acid-trapping component in the solvent,
cooling said dispersion to 10° C. or lower,
mixing a short-chain reactant being acetyl chloride and/or propionyl chloride and a long-chain reactant being an acid chloride of a long-chain fatty acid to form a solid-liquid heterogeneous system maintained at 10° C. or lower.

13. The method for producing the paramylon-based resin according to claim 1, wherein the hydrolyzing is conducted using a hydrochloric acid solution.

14. The method for producing the paramylon-based resin according to claim 1, further comprising washing a solid content containing the acylated paramylon, obtained in the separating from the solvent, with a mixture of methanol and water.

15. The method for producing the paramylon-based resin according to claim 1, wherein $DS_{Lo}$ is in a range of 0.1 to 0.5, and $DS_{Sh}$ is in a range of 2.0 to 2.5.

16. The method for producing the paramylon-based resin according to claim 1, wherein the long-chain component of the paramylon-based resin is a linear saturated aliphatic acyl group having 14 or more and 30 or less carbon atoms.

17. The method for producing the paramylon-based resin according to claim 1, wherein the long-chain component is an acyl group moiety of at least one fatty acid selected from myristic acid, palmitic acid, stearic acid, arachidic acid, and behenic acid.

18. The method for producing the paramylon-based resin according to claim 1, wherein the paramylon-based resin is a molding material.

\* \* \* \* \*